Figure 1:
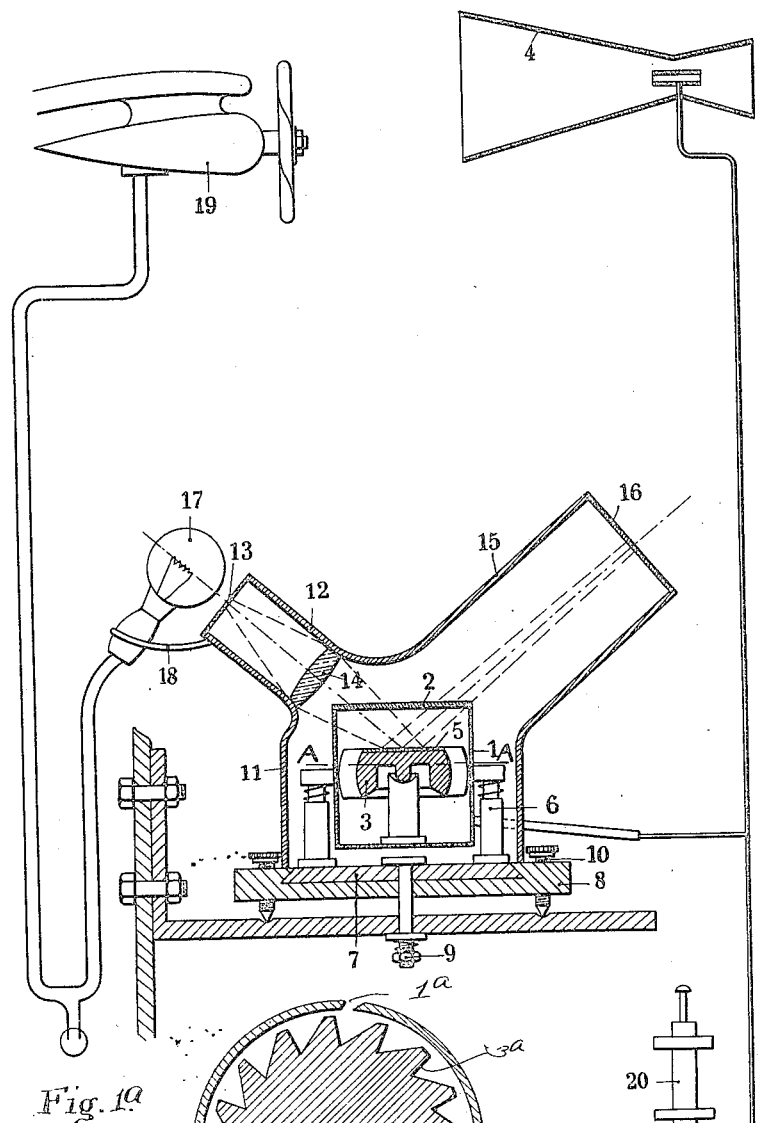
Figure 1A:
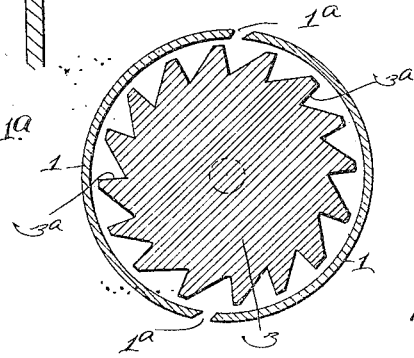

E. E. J. BONNEAU, Y. P. G. LE PRIEUR, AND G. DERRIEN.
LUMINOUS GYROCLINOMETER.
APPLICATION FILED SEPT. 18, 1919. RENEWED FEB. 27, 1922.

1,412,997.

Patented Apr. 18, 1922.
2 SHEETS—SHEET 1.

Inventors:
Edme Etienne Joseph Bonneau
Yves Paul Gaston Le Prieur
Georges Derrien
per H. W. Plucker
Attorney.

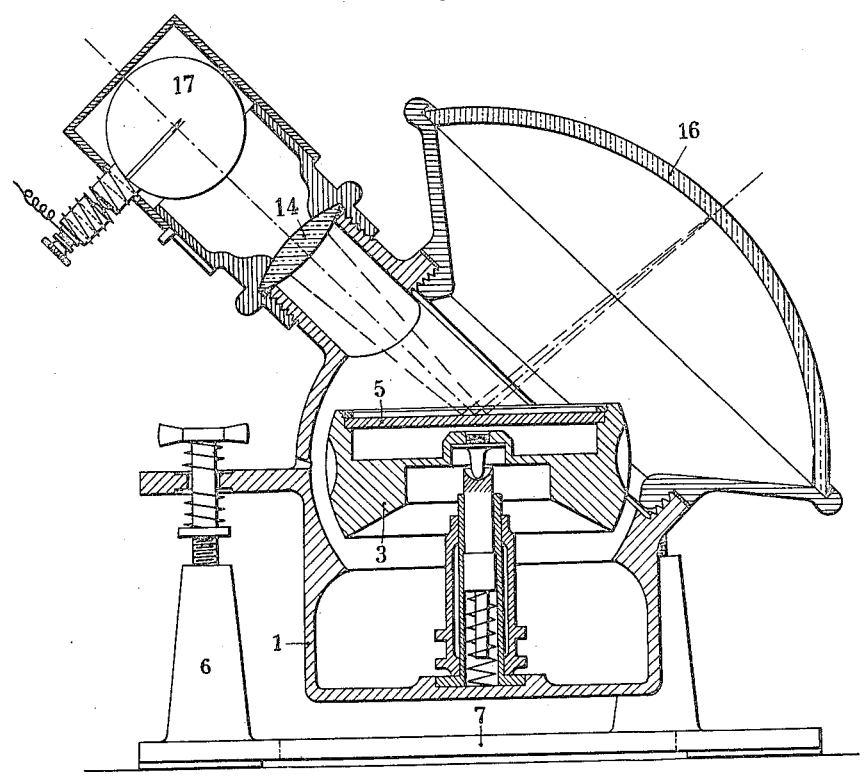

UNITED STATES PATENT OFFICE.

EDME ETIENNE JOSEPH BONNEAU, YVES PAUL GASTON LE PRIEUR, AND GEORGES DERRIEN, OF PARIS, FRANCE.

LUMINOUS GYROCLINOMETER.

1,412,997.                    Specification of Letters Patent.    Patented Apr. 18, 1922.

Application filed September 18, 1919, Serial No. 324,677. Renewed February 27, 1922. Serial No. 539,737.

*To all whom it may concern:*

Be it known that we, EDME ETIENNE JOSEPH BONNEAU, of 15 Rue Beudant, in the city of Paris, France, engineer, YVES PAUL GASTON LE PRIEUR, of 91 Rue de Longchamps, in the city of Paris, France, naval lieutenant, and GEORGES DERRIEN, of 57 Rue Cortambert, in the city of Paris, France, naval lieutenant, have invented a Luminous Gyroclinometer, (for which we have filed applications in France, Aug. 8, 1918, and addition May 20, 1919,) of which the following is a clear, full, and exact description.

The invention has for its object an instrument more particularly adapted for aerial navigation and permanently, accurately and instantaneously indicating to the pilot of the aircraft the inclinations of his apparatus, in any direction.

The indications given by this instrument, being greatly amplified, enable the pilot to maintain his machine at the required inclination (horizontal flight, descent, etc.,) by manipulating his controls in accordance with the inclinations perceived on the dial of the instrument.

This invention solves the problem of navigation in hazy weather, in clouds, at night and also that of rigorously maintaining the machine in horizontal position, for example when dropping bombs, during flying off and at the moment a hydroplane takes the water at night.

In fact, the indications furnished by the gyro-clinometer forming the subject-matter of this invention are clear and distinct on account of the feeble deviations which ordinarily affect the luminous index indicator as regards the graduations of the instrument.

The indications given by this instrument are instantaneous; moreover they bear on the vertical; conditions necessary for an instrument of this kind which is to be used for piloting without seeing the horizon.

The present luminous gyro-clinometer substantially comprises:

1. A gyroscope the axis of rotation of which keeps a given direction in space and automatically takes this direction under the mere apparent effect of the rotation, such as the meridian herpolhode gyroscopic top forming the subject matter of the French patent application of Edme Bonneau, of April 8th, 1916, No. 32,780.

2. A luminous focus optical system causing a luminous spot, the displacements of which represent the amplified inclinations of the aircraft, to appear on a translucent dial after reflection on a mirror, mounted on the gyroscopic top at right angles to its axis of rotation.

In order that this invention may be clearly understood, a form of execution of the same will be described hereafter with reference to the accompanying drawing, in which:

Figure 1 is a vertical section of the improved instrument and

Figure 1ª is a horizontal section, on a larger scale, taken on the line A—A of Figure 1.

Figure 2 is a section illustrating a modification on an enlarged scale.

As shown in Fig. 1, the instrument comprises a casing 1 closed at its upper part by a glass plate 2 and within which may rotate a gyroscopic top 3 constituted as described in the said French patent application.

This casing is connected to an apparatus of the Venturi tube type, carried for instance by one of the spars of the aircraft and adapted to produce a vacuum within the casing 1; the latter is provided with small holes 1ª which are suitably arranged and inclined, as shown in Fig. 1ª, so that, under the action of the said vacuum, the air of the atmosphere flows into the casing 1 and strikes against blades cut on the periphery of the gyroscopic top, thus causing the rotation of the latter.

This gyroscopic top is provided, at its upper part, with a mirror 5 at right angles to its axis of rotation and occupying a perfectly horizontal position, as soon as the speed of rotation of the top reaches a certain number of revolutions, notwithstanding the inclinations and accelerations which may be taken by the casing 1 of the instrument.

The casing 1 yieldingly rests, by means of springs, on small uprights 6 mounted on a base 7; the latter is mounted on a bed plate 8 provided with three adjusting and fastening screws 10.

This base and bed plate are fastened, by means of a bolt 9, on any support whatever secured for instance to the fuselage of the aircraft.

The gyroscopic top is enclosed within an outer body 11 carrying, on the one hand, an optical system directing a beam of light on the mirror 5 and, on the other hand, a translucent dial on which appears a luminous spot formed by the reflection of this beam of light. For that purpose, the outer body 11 is formed with a branch 12 provided at its end with a diaphragm 13 perforated with a small hole through which enters the beam of light; within this branch 12 is mounted a double convex lens 14, arranged in such a manner as to cause this beam of light to converge on the rotary mirror 5 carried by the gyroscopic top 3; moreover, this lens is mounted in such a way that its optical axis passes through the center of the mirror when the axis of the casing 1 of the instrument is vertical.

On the other hand, the outer body is formed with another branch 15 at the end of which is mounted a dial made of ground glass 16, at such a distance from the mirror that the total length of the incident bundle of rays emanating from the lens 14 and of the reflected bundle of rays projected on the dial 16 will be equal to the focal length of the lens 14 and that the luminous spot which appears on this dial 16 will thus be in focus.

This device has the advantage of producing an amplification of the apparent displacements of the luminous spot relatively to the inclinations of the body of the instrument, by reason, on the one hand, of the length of the reflected beam of light and, on the other hand, because the latter moves according to angles which are double relatively to the angles of inclination of the instrument body (the angles of incidence and of reflection totalizing); it results therefrom that the instrument gives on the dial readings on a very large scale.

The beam of light is supplied by a lamp 17, mounted on a support 18 secured on the branch 12 and fed, for example, by a generator 19 actuated by the advance of the aircraft in the air.

Figure 2 illustrates a modification in which the source of light and the lens on the one hand, and the translucent dial, on the other hand, are carried by the casing 1 enclosing the gyroscopic top 3.

Moreover, in this modification, the translucent dial 16 is in the form of a spherical cap the center of which coincides with that of the concave surface of the step bearing on which rests the pivot of the gyroscopic top.

In this luminous gyro-clinometer, the rotary movement of the gyroscopic top may also be controlled by the action of the suction of the aircraft engine, or by the expansion of a compressed gas; in the two latter cases, the instrument will be provided with a pressure reducing dvice adapted to adjust to a constant value the rate of the air and gas jets, so that the rotation of the gyroscopic top does not exceed a predetermined angular speed.

The improved gyro-clinometer operates as follows:

At the time of flying off, the top is released and, one or two minutes after its release, it reaches a sufficient speed (800 to 1000 revolutions per minute) under the action of the air current which penetrates into the case 1 through the holes 1ª under the effect of the depression created in the interior of this case by the Venturi tube 4; the luminous spot, formed on the dial 16 by the beam of light emitted by the lamp 17 and reflected by the mirror 5 mounted on the gyroscopic top 3, becomes stationary and the pilot observes its apparent displacements on the dial 16, when the aircraft inclines, the dial being directly under his eyes.

The adjustment of this gyro-clinometer consists, the aircraft being on the ground and placed in position for horizontal flight, in actuating the gyroscopic top, by driving back air within the casing 1 of the latter, for example by means of a hand pump 20, then in feeding the lamp 17 constituting the source of light and finally in turning the adjusting screws, so as to bring the luminous spot at the center of the dial.

It is to be understood that the above described methods of carrying out the invention are given only by way of example and that the form, sizes and details of construction of the present type of apparatus may be varied without departing thereby from the scope of the invention.

We claim:

1. A luminous gyro-clinometer, more particularly adapted for aerial navigation and permanently indicating to the pilot the inclinations of his aircraft, comprising: a gyroscope the axis of rotation of which keeps a given direction in space,—a source of light,—a mirror mounted on the gyroscope at right angles to its axis of rotation,—means for directing on this mirror a beam of light emitted by the source of light,—and a translucent dial on which appears a luminous spot formed by the beam of light reflected by the mirror.

2. A luminous gyro-clinometer, more particularly adapted for aerial navigation and permanently indicating to the pilot the inclinations of his aircraft, comprising: a meridian herpolhode gyroscopic top the pivot of which is in the form of a spherical cap of substantial diameter and the center of gravity of which coincides with the center of this spherical cap,—a source of light,—a mirror mounted on the gyroscope at right angles to its axis of rotation,—means for directing on this mirror a beam of light emitted by the source of light,—and a translucent dial on which appears a luminous spot formed by the beam of light reflected by the mirror.

3. A luminous gyro-clinometer, more particularly adapted for aerial navigation and permanently indicating to the pilot the inclinations of his aircraft, comprising: a gyroscopic top,—a source of light,—a mirror mounted on the gyroscopic top at right angles to its axis of rotation,—a lens directing on this mirror a beam of light emitted by the source of light,—and a translucent dial on which appears a luminous spot formed by the beam of light reflected by the mirror.

4. A luminous gyro-clinometer, more particularly adapted for aerial navigation and permanently indicating to the pilot the inclinations of his aircraft, comprising: a gyroscopic top,—a source of light,—a mirror mounted on the gyroscopic top at right angles to its of axis rotation,—a casing within which can turn the gyroscopic top,—means for imparting a movement of rotation to the said top,—a double convex lens mounted on the said casing so as to direct on the mirror a beam of light emitted by the source of light,—and a translucent dial also carried by the said casing and on which appears a luminous spot formed by the beam of light reflected by the mirror.

5. A luminous gyro-clinometer, more particularly adapted for aerial navigation and permanently indicating to the pilot the inclinations of his aircraft, comprising: a gyroscopic top,—a source of light,—a mirror mounted on the gyroscopic top at right angles to its axis of rotation,—a casing within which can turn the gyroscopic top,—means for imparting a movement of rotation to the said top,—a support on which is yieldingly mounted the said casing,—an outer body within which is located the casing containing the gyroscopic top,—a double convex lens mounted in a branch formed on the outer body, so as to direct on the mirror a beam of light emitted by the source of light,—a diaphragm perforated with a small hole, mounted at the end of the branch carrying the lens and through which enters the beam of light,—and a translucent dial carried by another branch and on which appears a luminous spot formed by the beam of light reflected by the mirror.

6. A luminous gyro-clinometer, more particularly adapted for aerial navigation and permanently indicating to the pilot the inclinations of his aircraft, comprising: a gyroscopic top,—a mirror mounted on the gyroscopic top at right angles to its axis of rotation,—a casing within which can rotate the gyroscopic top,—means for imparting a movement of rotation to the said top,—a double convex lens mounted in a branch formed on the said casing,—an electric incandescent lamp,—means for mounting this lamp in front of the double convex lens,—and a translucent dial also carried by the casing and on which appears a luminous spot formed by the beam of light reflected by the mirror.

7. A luminous gyro-clinometer, more particularly adapted for aerial navigation and permanently indicating to the pilot the inclinations of his aircraft, comprising: a gyroscopic top,—a mirror mounted on the gyroscopic top at right angles to its axis of rotation,—a casing within which can turn the gyroscopic top,—means for imparting a movement of rotation to the said top,—a double convex lens mounted in a branch formed on the said casing,—an electric incandescent lamp,—means for mounting the said lamp in front of the double convex lens,—a translucent dial also carried by this casing, the said dial being constituted by a translucent spherical cap the center of which coincides with that of the concave surface of the step bearing on which rests the pivot of the gyroscopic top,—and a support on which is yieldingly mounted the said casing.

The foregoing specification of our "luminous gyro-clinometer," signed by us, this seventh day of August 1919.

EDME ETIENNE JOSEPH BONNEAU.
YVES PAUL GASTON LE PRIEUR.
GEORGES DERRIEN.